United States Patent
Rottino

[19]
[11] Patent Number: 6,116,024
[45] Date of Patent: Sep. 12, 2000

[54] TORQUE CONVERTER EMPLOYING A MECHANICAL DIODE

[75] Inventor: Daniel M. Rottino, Lebanon, Conn.

[73] Assignee: TCP Performance Converters, Willimantic, Conn.

[21] Appl. No.: 09/311,523

[22] Filed: May 13, 1999

[51] Int. Cl.[7] .............................. F16D 33/18; F16D 11/14
[52] U.S. Cl. ............................ 60/345; 192/46; 192/69.3; 192/69.82
[58] Field of Search .............................. 60/345; 192/3.34, 192/46, 69.3, 69.82

[56] References Cited

U.S. PATENT DOCUMENTS

| | | | |
|---|---|---|---|
| 2,461,217 | 2/1949 | Lapsley et al. | 60/345 X |
| 5,125,487 | 6/1992 | Hodge | 192/3.34 |
| 5,690,202 | 11/1997 | Myers | 192/46 |
| 5,699,889 | 12/1997 | Gadd | 192/35 |
| 5,855,263 | 1/1999 | Fergle | 60/345 X |
| 5,918,461 | 7/1999 | Bacon | 60/345 X |

Primary Examiner—Rodney H. Bonck
Attorney, Agent, or Firm—McCormick, Paulding & Huber LLP

[57] ABSTRACT

In a torque converter for a motor vehicle a plurality of rotary members are provided including a drive member and a driven member, each located along a common rotational axis. A stator is positioned between the drive and driven members and has a central hub having a bore coaxial with the common rotational axis. The stator includes an outer ring approximately concentric with the central hub, and a plurality of radially spaced blades extending between the hub and the outer ring. A mechanical diode is positioned in the bore and includes a dog clutch to transmit torque when the mechanical diode is driven in a first rotational direction causing the inner and outer members to rotate together, and a ratchet clutch to allow the inner member to rotate relative to the outer member when the diode is driven in a second rotational direction. An adaptor is also provided for coupling the mechanical diode to the hub such that the mechanical diode is positioned coaxial with the common rotational axis.

10 Claims, 3 Drawing Sheets

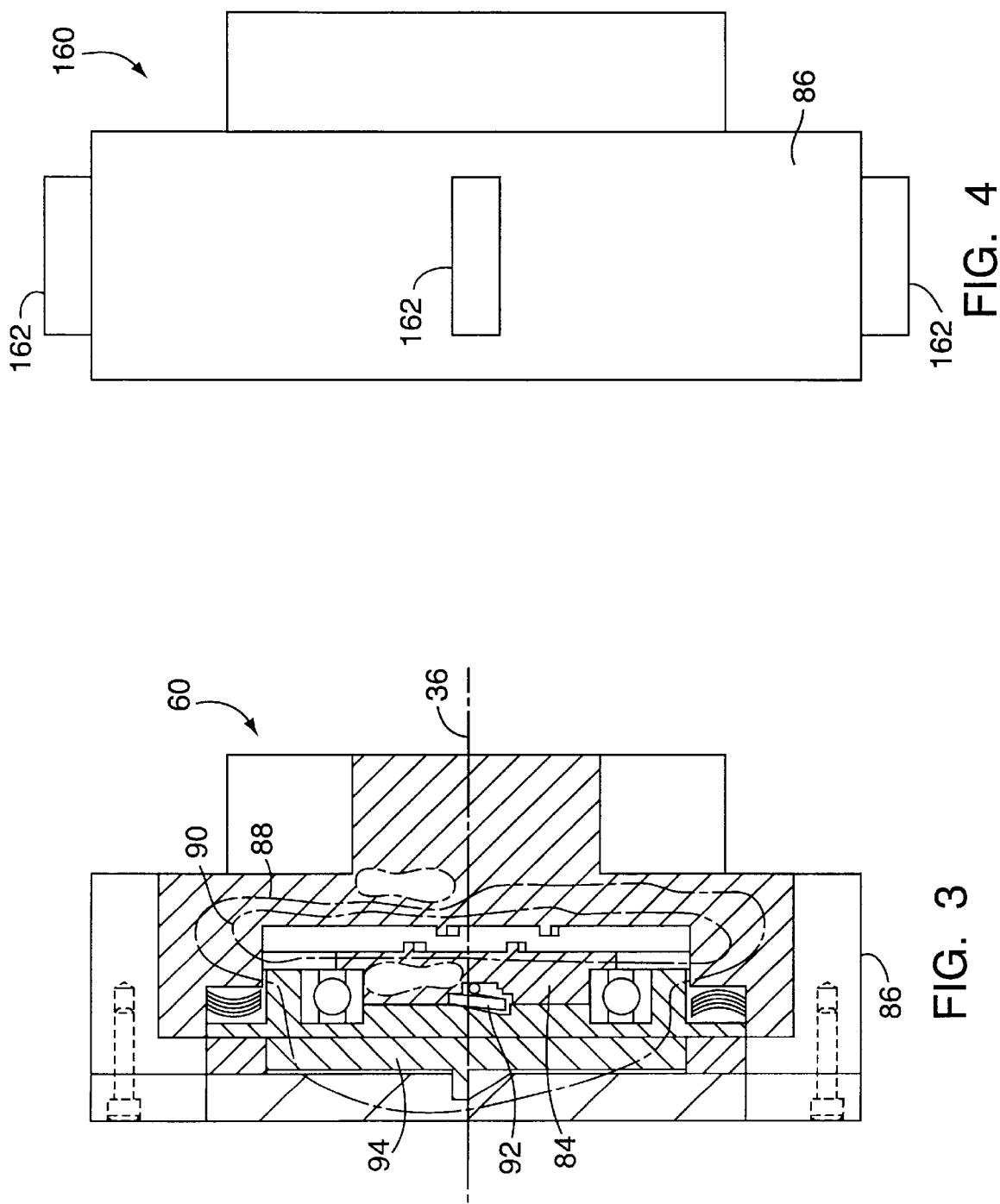

TORQUE CONVERTER EMPLOYING A MECHANICAL DIODE

FIELD OF THE INVENTION

The present invention is generally related to torque converters used in motor vehicles, and is more specifically directed to adapting a one-way drive for use in a torque converter, the drive employing a dog clutch to transmit torque when driven in a torque transmitting direction, and a ratchet clutch to provide an overrun function.

BACKGROUND OF THE INVENTION

Motor vehicles that have automatic transmissions usually employ torque converters positioned between the flexplate or flywheel of the vehicle's engine, and the input shaft of the transmission. In general, the torque converter offers two main advantages. First, at low engine speeds, torque converters multiply the torque, usually by a ratio of about two to one, produced at the flywheel, thereby providing increased power to the driven wheels of the vehicle. Second, the torque converter allows the car to stop and idle without disconnecting the engine from the rest of the drive train.

Most torque converters consist of three main components; the impeller, the turbine, and the stator. The impeller is generally bolted directly to the flexplate and rotates at engine speeds. The turbine is usually coupled to the input shaft of the vehicle's transmission. The stator is positioned between the impeller and the turbine and is equipped with a one way clutch. All three components have canted blades and the entire torque converter assembly is filled with transmission fluid which is shared with the rest of the transmission.

During operation, the engine spins the impeller, the vanes of which accelerate and pressurize the transmission fluid forcing the fluid toward the outer circumference of the torque converter. The pressurized fluid impinges upon the blades of the turbine, causing the turbine and the rest of the drive train to turn in the same direction as the engine. If resistance in the drive train is greater than the force exerted by the transmission fluid against the turbine blades, the turbine will remain stationary and the torque converter will "slip" allowing the vehicle to remain at a standstill.

As the turbine begins to rotate, the rate of rotation will be slower than that of the impeller, causing the transmission fluid to exit the turbine at an angle, and enter the stator. The blades of the stator further accelerate the transmission fluid and direct it back into the impeller at a higher pressure, where it is accelerated again by the impeller and returned to the turbine at an even higher pressure. The above-described flow of transmission fluid is referred to by those skilled in the pertinent art to which the invention pertains, as "vortex flow" and it is what creates the torque multiplication that gives vehicles equipped with automatic transmissions high low speed torque. The one way clutch in the stator prevents the stator from spinning in the wrong direction and destroying the vortex flow.

As the turbine speed approaches that of the impeller, centrifugal force causes the transmission fluid to be thrown from the turbine to the outer circumference of the torque converter preventing the fluid from being returned to the impeller. At the point where the turbine is spinning at roughly 90% of the impeller speed, the transmission fluid begins to impinge on the backs of the stator blades, unlocking the one way clutch and forcing the stator to turn in the same direction as the impeller and turbine. At this point there is no torque multiplication.

The one way clutch used in most torque converters is usually a sprag-type overriding clutch similar to that shown in FIG. 1. The illustrated clutch includes an outer race 10 and a cam stator 12 positioned within and coaxial with the outer race. The cam stator 12, includes a plurality of ramped portions 14 adjacent to a plurality of abutment walls 16. The outer race 10 and the cam stator 12 coact to define a plurality of pockets 18 located between successive abutment walls 16, each pocket having a roller 20 located therein. During operation, if a torque is applied to the outer race 10 in the direction indicated by the arrow labeled "Engaged", the rollers will move up the ramped portions 14 and become wedged between the cam stator 12 and the outer race 10 thereby preventing any relative rotation between the cam stator and the outer race. If the direction of the torque is reversed, the rollers 20 will be forced down the ramped portions 14, allowing the rollers to spin, causing relative rotation to occur between the outer race and the cam stator.

A problem occurs when attempting to employ the above-described torque converters in high performance situations such as drag racing, and is due to the fact that while the turbine is ramping up to the speed of the impeller, and the torque converter is operating to multiply torque to the driven wheels of the vehicle, tremendous heat is generated in the converter. In addition, exorbitantly large forces are exerted on the clutch components. The combination of temperature and force often cause the clutch to fail resulting in the destruction of the torque converter.

The same problem occurs at high stall speeds. Stall speed refers to the rate of engine rotation, e.g., engine RPM, that can be attained at full throttle with the vehicle's brakes locked and the transmission in gear, before the driven wheels turn. When performance modifications are made to a vehicle for, inter alia, drag racing, one of the objectives is to shift the engine's "torque curve" upward into a higher RPM range. In order to take advantage of this performance enhancement, the stall speed of the torque converter must also be increased accordingly. However, when converters employing one-way clutches of the type described above are used, the problem associated with temperature and excessive force is exacerbated, to the detriment of the clutch and thereby the converter. This is particularly true as the size of the torque converter decreases.

Based on the foregoing, it is the general object of the present invention to provide a torque converter that overcomes the problems and drawbacks of prior art torque converters.

It is a more specific object of the present invention to provide a stator/clutch assembly for a torque converter that can withstand high stall speeds.

SUMMARY OF THE INVENTION

The present invention is directed to a torque converter for a motor vehicle, the torque converter having a plurality of rotary members including a driven member and a drive member, each located along a common rotational axis. A stator is positioned between the driven member and the drive member, and includes a central hub having a bore coaxial with the common rotational axis. The stator also includes an outer ring approximately concentric with the central hub, and a plurality of radially spaced blades extending between the hub and the outer ring. A mechanical diode is positioned in the bore and has a generally cylindrical inner and a generally cylindrical outer member. The mechanical diode includes a dog clutch to prevent relative rotation between the inner and outer cylindrical members, thereby allowing the diode to transmit torque when driven in a first rotational direction.

The mechanical diode also includes a ratchet clutch that allows the inner and outer members to rotate relative to one another in an overrun condition when the inner or outer member is driven in a second rotational direction opposite the first rotational direction. In addition, when the ratchet clutch is driven in the first rotational direction it functions to engage the dog clutch.

The mechanical diode is coupled to the stator hub via mounting means such that the diode is coaxial with the above-described common rotational axis. Means are also provided for inducing rotation in the drive member in response to cyclic flow of a fluid along a path from the drive member to the driven member, then from the driven member through the blades of the stator causing an increase in fluid pressure and then back to the driven member.

Preferably, the mounting means includes an adapter having a first bore coaxial with the common rotational axis and defined by a first bore wall. A plurality of tabs projecting radially from a peripheral surface defined by the adapter and engage mating slots in a second bore defined by the central hub of the stator and coaxial with the common axis of rotation. The mechanical diode is positioned in the adapter bore and is retained by the first bore wall.

In the preferred embodiment of the present invention, the outer member of the mechanical diode defines a peripheral surface having a plurality of radially disposed slots extending at least part-way therethrough. The adapter includes a plurality of projections extending inwardly from the bore wall of the adapter, each adapted to mate with one of the slots in the outer member, thereby preventing any relative rotation between the outer member of the mechanical diode and the adopter.

An advantage of the present invention is that the dog clutch can transmit larger loads than conventional one way clutches thereby being able to accommodate higher stall speeds.

Another advantage of the present invention is that since the ratchet clutch when driven in the torque transmitting direction is only used to engage the dog clutch and does not need to transmit high loads, it can be designed to provide high overrun speed capability without reducing the torque transmitting capabilities of the overall one-way device.

BRIEF DESCRIPTION OF THE DRAWINGS

FIG. 3 is a cross sectional side elevational view of a mechanical diode forming part of the torque converter of FIG. 2.

FIG. 4 is a side elevational view of an alternate embodiment of the mechanical diode of FIG. 3.

DETAILED DESCRIPTION OF THE PREFERRED EMBODIMENTS

Figure 1:
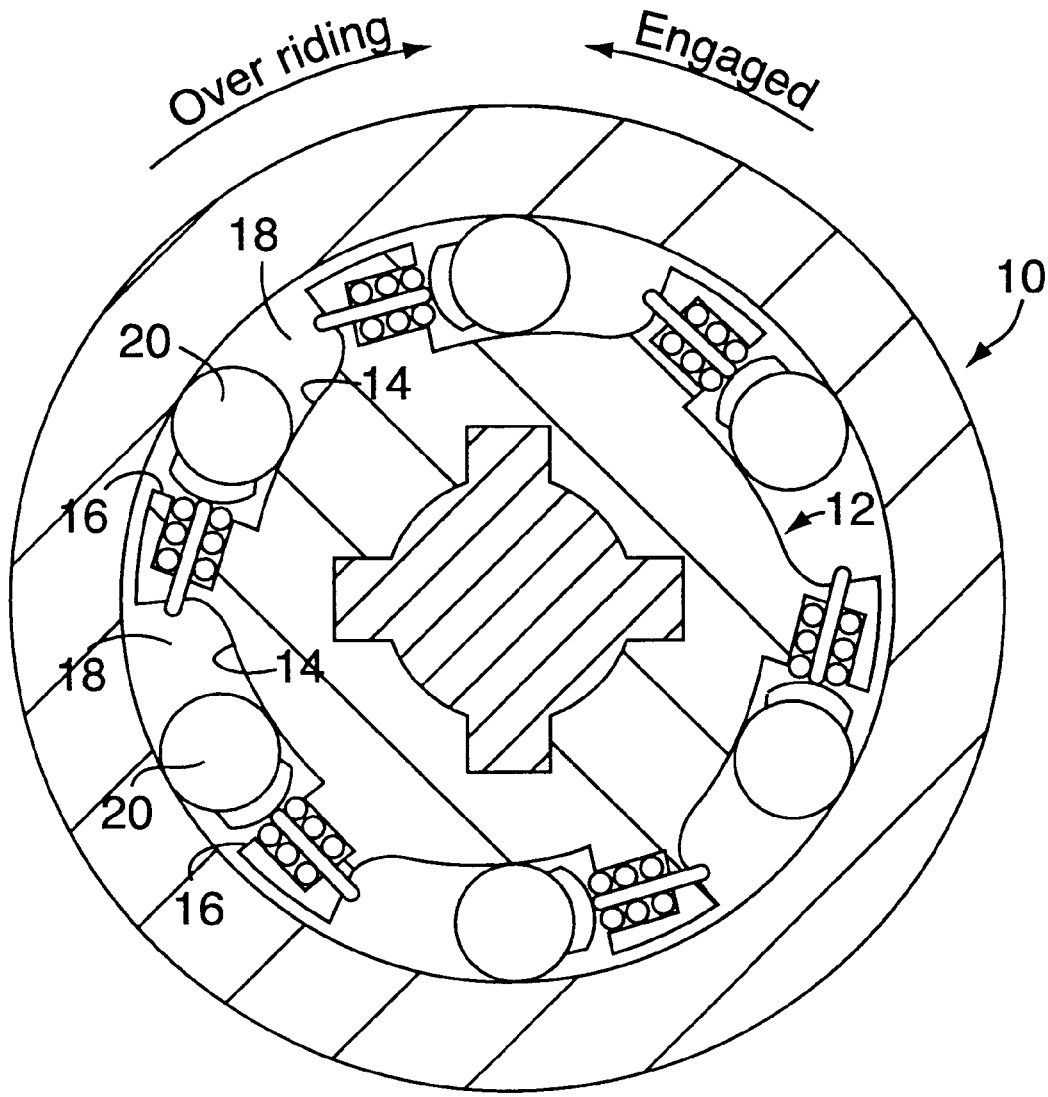
FIG. 1 is a cross sectional plan view of a prior art sprag-type clutch.
Figure 2:
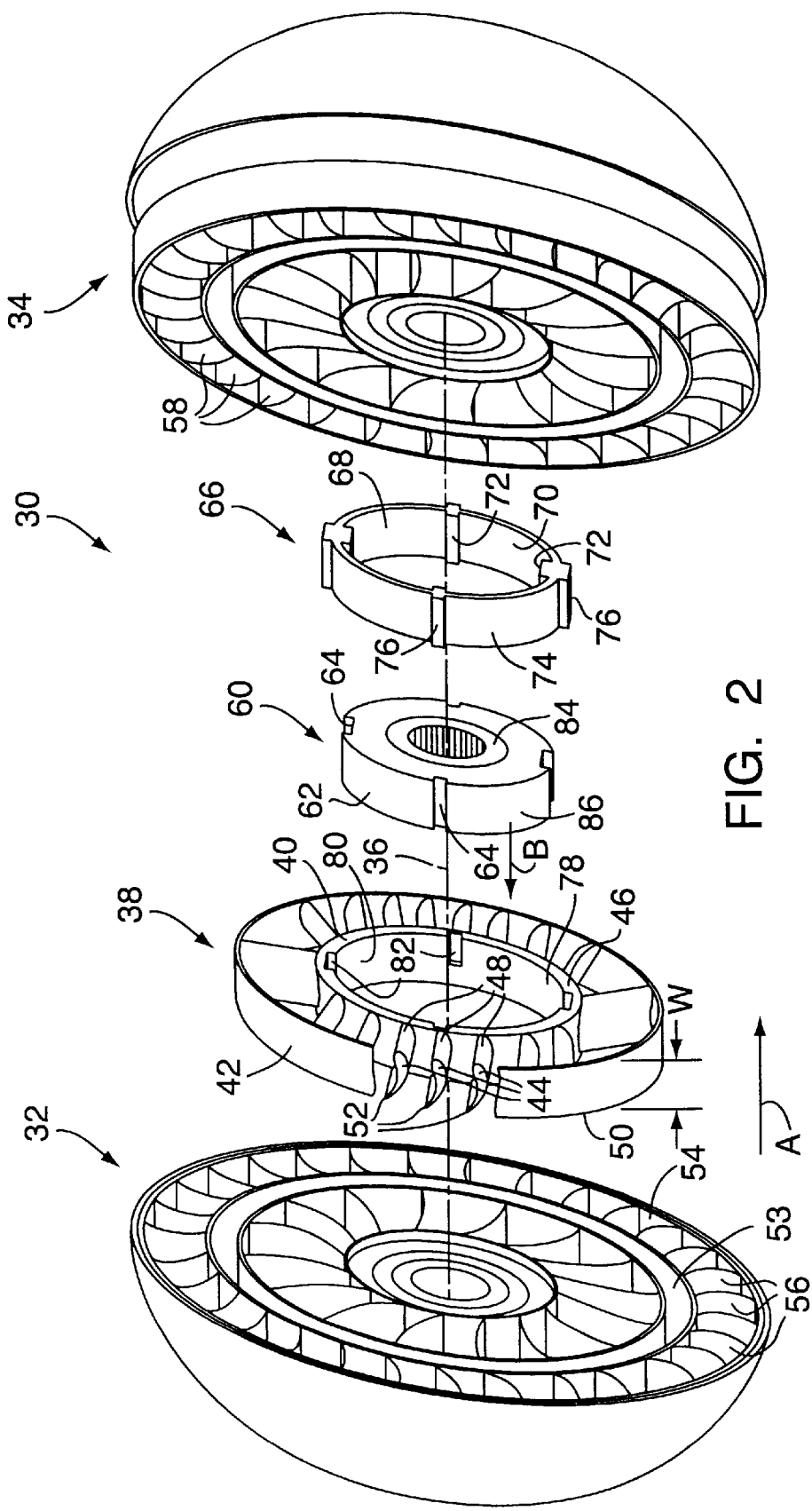
FIG. 2 is a partial exploded view of the torque converter of the present invention.

As shown in FIG. 2, a torque converter of the present invention is generally designated by the reference number 30. The torque converter 30 employs a plurality of rotary members including a drive member 32 and a driven member 34, each located along a common rotational axis 36. A stator 38 is positioned between the drive and driven members, 32 and 34 respectively and includes a central hub 40 substantially coaxial with the common rotational axis 36. The stator 38 also includes an outer ring 42 approximately concentric with the central hub 40. A plurality of radially spaced blades 44 extend between the hub and the outer ring and are attached thereto. The stator 38 defines a first side 46 adjacent to leading edges 48 defined by the blades 44, and a second side 50 adjacent to trailing edges 52 of the blades.

The drive member 32 includes an interior area 53 defined by an interior wall 54. A plurality of vanes 56 project outwardly from the interior wall 54 forming an impeller. Similarly, the driven member 34 is in the form of a cylindrical turbine and defines a plurality of blades 58 radially spaced about the common rotational axis 36. The blades 58 of the turbine 34 face the vanes 56 of the impeller 32.

Still referring to FIG. 2, a cylindrical mechanical diode 60, the operation of which will be explained in detail hereinbelow, has an outer periphery 62 that defines a plurality of slots 64 spaced radially along the periphery 62. An adapter 66 includes a central bore 68 coaxial with the common rotational axis 36 and defined by a bore wall 70, the bore being adapted to pressingly retain the periphery 62 of the mechanical diode 60. A plurality of projections 72 extend inwardly from the bore wall 70 and are radially spaced thereabout. Each of the projections 72 engage the slots 64 in the mechanical diode 60, thereby preventing any relative movement between the outer periphery of the mechanical diode and the adapter 66. Preferably, the adapter is made from a suitable material, such as, but not limited to steel.

Still referring to FIG. 2, the adapter 66 includes an outer cylindrical surface 74 having a plurality of tabs 76 (only three shown) projecting radially therefrom. The hub 40 of the stator 38 includes a bore 78 coaxial with the common rotational axis 36 and defined by a bore wall 80. The bore wall 80 includes a plurality of mating slots 82 extending from the first side 46 of the stator 38, part way through the width "W" of the hub 40. The tabs 76 of the adapter 66 engage the mating slots 82 thereby retaining the adapter 66 and the mechanical diode 60, in the bore 78. It is important that the slots 80 extend from the first side 46 of the hub 40 part way through the hub width "W", so that during operation of the torque converter, the mechanical diode 60 is pushed into the bore by the pressure of the circulating transmission fluid, rather than out of it.

As shown in FIG. 3, the mechanical diode 60 includes an inner member 84 adapted to receive rotational input about the common rotational axis 36 in a first rotational, torque transmitting, direction, or a second, overrunning, rotational direction opposite to the first rotational direction. The mechanical diode 60, also includes an outer member 86 mounted for rotation about the common rotational axis 36 in at least the first, torque transmitting, rotational direction. A mechanical diode as described herein is disclosed in U.S. Pat. No. 5,699,889 entitled "ONE WAY DRIVE DEVICE WITH A DOG CLUTCH TO TRANSMIT TORQUE AND A RATCHET CLUTCH TO PROVIDE AN OVERRUN FUNCTION", issued on Dec. 23, 1997 to Gadd, and assigned to Epilogics, LP of Los Gatos, Calif., the specification of which is incorporated herein by reference.

Still referring to FIG. 3, inner member 84 is also mounted for limited axial movement relative to the outer member 86 along the common rotational axis 36 between a first position disengaged from the outer member 86, and a second position engaged with the outer member. The mechanical diode 60 includes a coupling arrangement 88 having a dog clutch 90, and a ratchet clutch 92. The dog clutch 90 is located between the inner member 84 and the outer member 86 and rotatably couples the inner and outer members when the inner member is in the engaged position and driven in the first torque transmitting direction. The coupling arrangement 90 also includes a coupling member 94 adjacent to the inner member 84 opposite the outer member 86. The ratchet clutch 92 is located between the inner member 84 and the coupling member 94. The ratchet clutch 92 rotationally couples the inner member 84 to the coupling member 94 in response to initial rotational movement of the inner member in the first torque transmitting direction. The coupling member 94 then moves the inner member 84 from the disengaged to the engaged position, thereby coupling the inner member 84 to the outer member 86. The ratchet clutch 92 also allows the inner member 84 to rotate freely in the second overrunning direction, relative to the coupling member 94.

By using the above-described mechanical diode 60, in the torque converter 30, the dog clutch 90 is able to transmit loads greater than would be possible using conventional one-way drive devices such as sprag clutches, or one way drives that only employ a ratchet clutch, when the inner member 84 is driven in the first torque transmitting direction. Moreover, since the ratchet clutch when driven in the first direction is only used to engage the dog clutch, it is not required to transmit large loads, thereby allowing the ratchet clutch to run at high overrun speeds without reducing the torque transmitting capabilities of the mechanical diode 60.

A second embodiment of the mechanical diode of the present invention, shown in FIG. 4, is generally designated by the reference numeral 160. The mechanical diode 160 is similar in many respects to the mechanical diode 60 described above and therefore like reference numerals preceded by the number 1 are used to indicate like elements. The mechanical diode 160 differs from the mechanical diode 60 in that there is no need for an adapter to mount the mechanical diode to the stator. Instead, the mechanical diode 160 includes a plurality of outwardly extending tabs 162, each adapted to be received in one of the slots 82 in the hub 40, thereby retaining the diode in the hub.

Referring back to FIG. 2, during operation the impeller 32 is attached to a flywheel (not shown) of an engine, and rotates at engine speeds. The turbine 34 is mounted to an input shaft to the vehicle's transmission, and the torque converter 30 is filled with transmission fluid. As the engine, and thereby the flywheel, rotates the impeller 32, the vanes 56 pump the transmission fluid to the outer circumference of the torque converter 30 as indicated by the arrow labeled "A". The pressurized transmission fluid is then acted on by the blades 58 of the turbine 34, forcing the turbine to turn in the same direction as the flywheel. However, if the resistance in the transmission is greater than the force of the transmission fluid, such as when the vehicle is stopped and the brakes are being applied, the turbine 34 will not rotate, and the converter "slips".

At lower speeds when the turbine 34 is rotating at a lower rate than the impeller 32, the transmission fluid will leave the turbine at an angle and enter the stator 38, as indicated by the arrow labeled "B". At this point the mechanical diode, 60, or 160 is in the engaged position. The blades 44 of the stator 38 accelerate the transmission fluid and send it back to the impeller 32 at an even greater pressure. The impeller 32 accelerates the transmission fluid yet again, and returns it to the turbine. This cycle continues until the turbine 34 is rotating at approximately the same rate as the impeller 32.

As the turbine 34 picks up speed to match that of the impeller 32, centrifugal force acts on the fluid preventing it from being returned to the impeller. When the turbine 34 is spinning at approximately 90% of the speed of the impeller 32, the transmission fluid begins to impinge on the trailing edges of the stator blades 44, casing the mechanical diode 60, 160 to disengage, forcing the stator to rotate in the second overrunning direction which in this case is the same direction as that of the rotation of the impeller 32 and the turbine 34.

While preferred embodiments have been shown and described, various modifications and substitutions may be made without departing from the spirit and scope of the present invention. Accordingly, it is to be understood that the present invention has been described by way of example, and not by limitation.

What is claimed is:

1. A torque converter for a motor vehicle comprising:

a plurality of rotary members including a drive member and a driven member, each located along a common rotational axis;

a stator positioned between said drive and driven members, said stator including a central hub having a bore coaxial with said common rotational axis, an outer ring approximately concentric with said central hub, and a plurality of radially spaced blades extending between said hub and said outer ring;

a mechanical diode positioned in said bore and having an inner member and an outer member, said mechanical diode including a dog clutch to transmit torque when said diode is driven in a first rotational direction causing said inner and outer members to rotate together, and a ratchet clutch to allow said inner member to rotate relative to said outer member when said diode is driven in a second rotational direction opposite said first rotational direction;

mounting means for coupling said mechanical diode to said hub such that said mechanical diode is coaxial with said common rotational axis; and means for inducing rotation in said drive member in response to cyclic flow of a fluid along a path from said drive member to said driven member, from said driven member through said blades of said stator, thereby causing an increase in fluid pressure, back to said driven member.

2. A torque converter as defined by claim 1, wherein:

said mounting means includes an adapter having a bore coaxial with said common rotational axis and defined by a first bore wall, a plurality of tabs projecting radially from an outer cylindrical surface defined by said adapter;

said mechanical diode is positioned in said adapter bore and retained by said first bore wall; and wherein said bore in said central hub is defined by a second bore wall having a plurality of slots extending at least part-way therethrough, said plurality of slots being adapted to receive said plurality of tabs, thereby retaining said mechanical diode in said first bore.

3. A torque converter as defined by claim 2, wherein:

said outer member of said mechanical diode includes an outside surface defining a plurality of slots extending at least part way through said outside surface; and said adapter includes a plurality of inwardly extending projections adapted to mate with said slots in said outside surface of said outer member, thereby securing said adapter to said mechanical diode, and preventing said outer member from rotating relative to said adapter during operation of said torque converter.

4. A torque converter as defined by claim 1 wherein:

said drive member is a cylindrical housing adapted to be coupled to a flywheel in an internal combustion engine, said housing having an interior area defined by a housing wall; and said housing wall having a plurality of vanes extending therefrom forming an impeller such that upon rotation of said impeller, said fluid is pumped from said impeller to said driven member.

5. A torque converter as defined by claim 4, wherein:

said driven member is a turbine adapted to be coupled to a motor vehicle drive train, said turbine defining a plurality of turbine blades upon which said fluid pumped from said impeller impinges, thereby exerting a torque in said turbine and said drive train.

6. A torque converter as defined by claim 2, wherein:

said blades in said stator define a leading edge adjacent to said turbine and a trailing edge adjacent to said impeller;

said slots in said central hub extending from a first side of said stator adjacent to said leading edges of said blades toward a second side of said stator adjacent to said trailing edges of said blades, such that during operation of said torque converter, said mechanical diode is retained in said second bore in part by transmission fluid flowing from said turbine through said stator, thereby impinging on said mechanical diode forcing said diode into said slots in said central hub.

7. A torque converter as defined by claim 1, wherein:

said mounting means for coupling said mechanical diode to said hub includes a plurality of tabs extending from an outer surface of said outer member, and wherein said plurality of tabs are adapted to engage a plurality of mating slots in a bore defined by said central hub, said bore being coaxial with said common rotational axis.

8. A torque converter for a motor vehicle comprising:

a plurality of rotary members including a drive member and a driven member, each located along a common rotational axis;

a stator positioned between said drive and driven members, said stator including a central hub having a bore coaxial with said common rotational axis, an outer ring approximately concentric with said central hub, and a plurality of radially spaced blades extending between said hub and said outer ring;

a mechanical diode positioned in said bore and having an inner member and an outer member, said mechanical diode including a dog clutch to transmit torque when said diode is driven in a first rotational direction causing said inner and outer members to rotate together, and a ratchet clutch to allow said inner member to rotate relative to said outer member when said diode is driven in a second rotational direction opposite said first rotational direction;

an adapter having a bore coaxial with said common rotational axis and defined by a first bore wall, a plurality of tabs projecting radially from an outer cylindrical surface defined by said adapter;

said mechanical diode being positioned in said adapter bore and retained by said first bore wall;

said bore and said hub being defined by a second bore wall having a plurality of slots extending at least partway therethrough, said plurality of slots being adapted to receive said plurality of tabs, thereby retaining said mechanical diode in said first bore;

means for inducing rotation in said drive member in response to cyclic flow of a fluid along a path from said drive member to said driven member, from said driven member through said blades of said stator, thereby causing an increase in fluid pressure, back to said driven member.

9. A torque converter as defined by claim 8, wherein:

said outer member of said mechanical diode includes an outside surface defining a plurality of slots extending at least part way through said outside surface; and said adapter includes a plurality of inwardly extending projections adapted to mate with said slots in said outside surface of said outer member, thereby securing said adapter to said mechanical diode, and preventing said outer member from rotating relative to said adapter during operation of said torque converter.

10. A torque converter as defined by claim 8, wherein:

said blades in said stator define a leading edge adjacent to said turbine and a trailing edge adjacent to said impeller;

said slots in said central hub extending from a first side of said stator adjacent to said leading edges of said blades toward a second side of said stator adjacent to said trailing edges of said blades, such that during operation of said torque converter, said mechanical diode is retained in said second bore in part by transmission fluid flowing from said turbine through said stator, thereby impinging on said mechanical diode forcing said diode into said slots in said central hub.

* * * * *